(12) United States Patent
Park

(10) Patent No.: US 6,774,972 B2
(45) Date of Patent: Aug. 10, 2004

(54) LCD AND METHOD FOR FABRICATING LCD

(75) Inventor: Sung Il Park, Taegu-Kwangyokshi (KR)

(73) Assignee: LG.Philips LCD Co., Ltd., Seoul (KR)

( * ) Notice: Subject to any disclaimer, the term of this patent is extended or adjusted under 35 U.S.C. 154(b) by 0 days.

(21) Appl. No.: 10/316,691

(22) Filed: Dec. 12, 2002

(65) Prior Publication Data

US 2003/0123015 A1 Jul. 3, 2003

(30) Foreign Application Priority Data

Dec. 29, 2001 (KR) .......................................... 2001-88452

(51) Int. Cl.⁷ ................................................ G02F 1/13
(52) U.S. Cl. ....................................... 349/153; 349/190
(58) Field of Search ................................... 349/153, 190

(56) References Cited

U.S. PATENT DOCUMENTS 6,424,401 B1 * 7/2002 Kang et al. .................. 349/153

* cited by examiner

Primary Examiner—James A. Dudek
(74) Attorney, Agent, or Firm—McKenna Long & Aldridge LLP

(57) ABSTRACT

An LCD includes a substrate, PAD connection lines on the substrate, a protection film over an entire surface of the substrate including the PAD connection lines. A portion of the protection film being removed to a predetermined thickness for coating a sealant thereon. The sealant being coated on the portion of the protection film having the predetermined thickness.

23 Claims, 9 Drawing Sheets

LCD AND METHOD FOR FABRICATING LCD

This application claims the benefit of the Korean Application No. P2001-88452 filed on Dec. 29, 2001, which is hereby incorporated by reference for all purposes as if fully set forth herein.

BACKGROUND OF THE INVENTION

1. Field of the Invention

The present invention relates to liquid crystal displays and a method for fabricating the same, and more particularly to a liquid crystal display and a method for fabricating a liquid crystal display, wherein adhesive characteristics of a sealant arranged between two substrates is enhanced.

2. Background of the Related Art

Compared to cathode-ray tubes (CRTs), flat panel displays (e.g., liquid crystal displays (LCDs), plasma display panels (PDPs), field emission displays (FEDs), etc.) display high quality images, consume a relatively low amount of power, produce a low amount of heat, and may be fabricated in small sizes. Due to these characteristics, LCDs in particular are extensively used in devices such as watches, calculators, personal digital assistants (PDAs), cellular phones, notebook computers, monitors for personal computers (PCs), televisions, TV receivers, monitors in airplanes, etc.

LCDs typically include a liquid crystal display panel for displaying a picture and a driving circuit for providing driving signals to the liquid crystal display panel. The liquid crystal display panel includes first and second glass substrates bonded to, and spaced apart from each other by a cell gap into which a layer of liquid crystal material is injected.

The first glass substrate (i.e., the TFT array substrate) supports a plurality of gate lines arranged at a fixed interval and oriented along a first direction, a plurality of data lines arranged at a fixed interval and oriented along a second direction, perpendicular to the first direction, a plurality of pixel electrodes arranged in a matrix pattern at pixel regions where the plurality of gate and data lines cross each other, and a plurality of switching devices (e.g., thin film transistors) responsive to signals supplied from gate lines for switching signal supplied from corresponding data lines and for transmitting the switched signals to corresponding pixel electrodes.

The second glass substrate (i.e., the color filter substrate) supports a black matrix layer for shielding light from parts excluding the pixel regions, an RGB color filter layer for transmitting light at predetermined wavelengths to thereby display colors, and a common electrode.

The first and second substrates are bonded together with sealant, the cell gap is maintained by spacers, and the layer of liquid crystal material is injected into the cell gap between the two substrates.

Sealants are typically provided as thermosetting or photosetting sealants. Typical thermosetting sealants are formed of a mixture of an epoxy resin and an amine or an amide curing agent. Thermosetting sealants are capable of bonding the two substrates when heated at approximately 100° C. for about one hour. Typical photosetting sealants include UV photosetting sealants and are formed of a mixture of an acrylate resin and a photosetting agent capable of forming radicals when exposed to UV light. Photosetting sealants are capable of bonding the two substrates when exposed to UV light for approximately 30 seconds.

The aforementioned sealants have excellent adhesive characteristics when bonded to glass substrates, but relatively poor adhesive characteristics when bonded to organic films. Nonetheless, organic films are used as protection films in reflective or semi-transmissive LCDs and in providing large aperture LCDs. In order to enhance the adhesive characteristics of sealants within large aperture LCDs containing an organic protection film, a portion of the organic protection film located under where the sealant is to be formed is removed. Accordingly, the sealant may contact the glass substrates and bond the two substrates together via strong adhesive characteristics.

FIG. 1 illustrates a related art LCD and a method for fabricating the LCD.

Referring to FIG. 1, though not shown, the first glass substrate 100 supports a plurality of gate lines arranged at a fixed interval and oriented along a first direction, a plurality of data lines arranged at a fixed interval and oriented along a second direction, perpendicular to the first direction, a plurality of pixel electrodes arranged in a matrix pattern at pixel regions where the plurality of gate and data lines cross each other, and a plurality of switching devices (e.g., thin film transistors) responsive to signals supplied from gate lines for switching signal supplied from corresponding data lines and for transmitting the switched signals to corresponding pixel electrodes.

Though not shown, the second glass substrate 150 supports a black matrix layer 130 for shielding a light from parts excluding the pixel regions, an RGB color filter layer for transmitting light at predetermined wavelengths to thereby display colors, and a common electrode.

A sealant 110 is coated on a periphery of the first or second glass substrate 100 or 150 for bonding the two substrates together. The black matrix layer 130 is arranged between an active display region 120 and the sealant 110.

Referring to FIG. 1, the first glass substrate 100 is formed larger than the second glass substrate 150 and a plurality of gate PAD connection lines 103 and a plurality of data PAD connection lines 104 are formed for applying signals to the plurality of gate and data lines, respectively.

Components are mounted on gate and data PCBs 105 and 106, respectively, are formed outside the first substrate 100. The components on the PCBs generate input signals (e.g., control signals, power signals, data signals, etc.) to a gate driver IC 107a and a data driver IC 107b included within gate and data TCPs 101 and 102, respectively. The gate and data driver ICs 107a and 107b, respectively, provide voltages to the gate and data lines, respectively. Connected to the gate PAD connection lines 103 and the data PAD connection lines 104, the gate and data TCPs 101 and 102 receive signals from the gate PCD 105 and the data PCB 106, respectively, and provide signals to the gate and data lines.

FIG. 2A illustrates a sectional view of area "E" shown in FIG. 1. FIG. 2B illustrates a back side view of the first glass substrate 100 having the sealant, PAD connection lines, and protection film coated thereon in area shown in FIG. 2A.

As described above, adhesive characteristics of the sealant are greater with respect to glass substrates than to organic films. In order to enhance adhesive characteristics between bonded substrates including an organic protection film 108, a portion of the organic protection film 108, located under where the sealant 110 is to be formed, is removed thereby allowing the sealant 110 to directly contact the first glass substrate 100.

Referring to FIGS. 2A and 2B, the gate PAD connection lines 103 are formed on the first glass substrate 100 and the data PAD connection lines 104 are formed on a gate insulating film (not shown) also formed on the first glass substrate 100. The organic protection film 108, being an insulating film, is formed over an entire surface of the first substrate 100, including the gate and data PAD connection lines 103 and 104.

The gate insulating film (not shown) and the organic protection film 108 are is selectively removed to expose portions of the first glass substrate 100 between the gate and data PAD connection lines, thereby forming opened areas 109. The sealant 110 is then coated on the organic protection film 108 such that the sealant 110 directly contacts the first glass 100 substrate at the opened areas 109.

Since thermosetting and photosetting sealants have better adhesive characteristics with glass substrates compared to the organic protection film 108, the opened area 109 allows the sealant 110 to directly contact the first glass substrate 100 and maximize the adhesive characteristics of the LCD device.

However, use of the aforementioned LCD fabricating method is disadvantageous for the following reasons.

First, the sealant is coated over the entire substrate including over the gate and data PAD connection lines formed of different materials, at different times, and under different fabricating conditions. The etching rate of the protection film is dependent upon the materials and patterns over which the protection film is formed. Accordingly, the uniformity of the cell gap between the first and second glass substrates may be reduced and blots are formed on the LCD.

For example, the gate PAD connection lines are spaced from each other at greater intervals than the data PAD connection lines. Accordingly, the size of the opened areas 109 between the gate PAD connection lines is larger than the size of the opened areas 109 between the data PAD connection lines. Further, depending on the location of the PAD connection lines, different types of connection lines may be further included within the gate or data PAD connection lines. As a result, when a uniform amount of sealant is coated on the opened parts 109, a height of the sealant 110 coated between the gate PAD connection lines is lower than a height of the sealant 110 coated between the data PAD connection lines and a non-uniform cell gap is created between the two glass substrates.

Second, as the resolution of LCDs increases, the distance between the PAD connection lines decreases. Accordingly, design of the opened areas becomes difficult.

SUMMARY OF THE INVENTION

Accordingly, the present invention is directed to an LCD and a method of fabricating an LCD that substantially obviates one or more of the problems due to limitations and disadvantages of the related art.

An advantage of the present invention provides an LCD and a method for fabricating an LCD, wherein adhesive characteristics of the sealant are maximized while the uniformity of the cell gap is maintained.

Additional features and advantages of the invention will be set forth in the description which follows, and in part will be apparent from the description, or may be learned by practice of the invention. These and other advantages of the invention will be realized and attained by the structure particularly pointed out in the written description and claims hereof as well as the appended drawings.

To achieve these and other advantages and in accordance with the purpose of the present invention, as embodied and broadly described, the liquid crystal display (LCD), may include first and second glass substrates bonded together by a sealant, PAD connection lines arranged on the first substrate, a protection film arranged over an entire surface of the first substrate including the PAD connection lines, wherein a portion of the protecting film, located under where the sealant is to be formed, is removed.

In one aspect of the present invention, a portion of the protection film is removed to a predetermined thickness.

In another aspect of the present invention, a portion of the protective film is removed between the PAD connection lines to form opened areas exposing the substrate between the PAD connection lines.

In still another aspect of the present invention, a method for fabricating an LCD may include steps of providing a substrate, forming PAD connection lines on the substrate, forming a protection film over the entire surface of the first substrate including the PAD connection lines, patterning portions of the protection film located under where sealant is to be coated such that the protection film is formed to a predetermined thickness over the PAD connection lines, and coating the sealant over the patterned portions of the protection film.

In yet another aspect of the present invention, a method for fabricating an LCD may include steps of providing a substrate, forming PAD connection lines on the substrate, forming a protection film over the entire surface of the first substrate including the PAD connection lines, patterning portions of the protection film located under where sealant is to be coated such that the protection film is formed to a predetermined thickness over the PAD connection lines and also such that the substrate is exposed between the PAD connection lines, and coating the sealant over the patterned portions of the protection film.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Reference will now be made in detail to embodiments of the present invention, examples of which are illustrated in the accompanying drawings.

Figure 3:
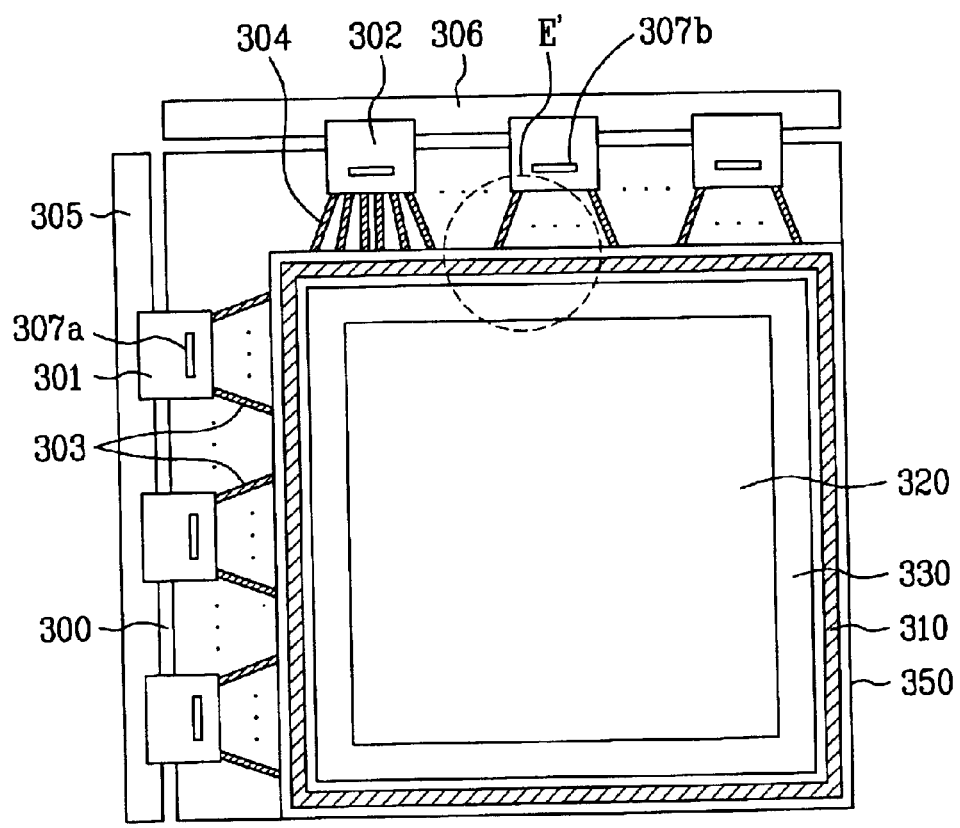
FIG. 3 illustrates a schematic view of an LCD device in accordance with an aspect of the present invention.

FIG. 3 illustrates a schematic view of an LCD device in accordance with one aspect of the present invention.

Referring to FIG. 3, a sealant 310 may, for example, be formed at a periphery of a first glass substrate 300 supporting a thin film transistor array. Alternatively, the sealant 310 may, for example, be formed on a second substrate 350 supporting a color filter array. In one aspect of the present invention, the sealant 310 may be used to bond the first and second glass substrates together. A black matrix layer 330 may be arranged on the second substrate 350 between an active display region 320 and the sealant 310.

The first substrate 300 may be formed larger than the second substrate 350. Gate and data PAD connection lines 303 and 304, respectively, may be provided to apply signals to a plurality of gate and data lines, respectively.

Components may be mounted on gate and data PCBs 305 and 306, respectively, formed on outside the first substrate 300. In one aspect of the present invention, the components may generate input signals (e.g., control signals, power signals, data signals, etc.) to a gate driver IC 307a and a data driver IC 307b included within gate and data TCPs 301 and 302, respectively. Connected to the gate and data PAD connection lines 303 and 304, respectively, the gate and data driver ICs 307a and 307b receive signals from the gate and data PCBs 305 and 306, respectively, and provide signals to the plurality of gate and data lines.

Figure 4A:
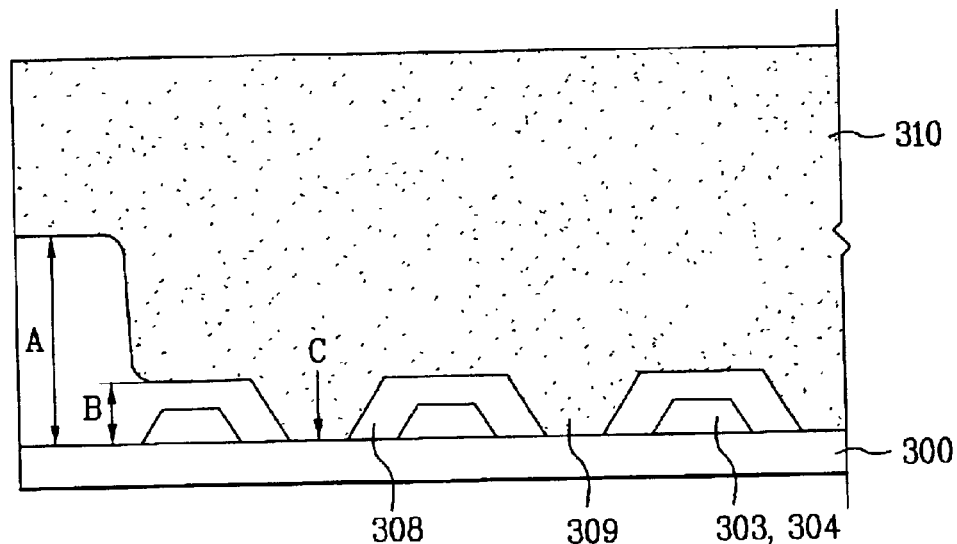
FIG. 4A illustrates a sectional view of area "E" shown in FIG. 3 in accordance with a first aspect of the present invention.
Figure 4B:
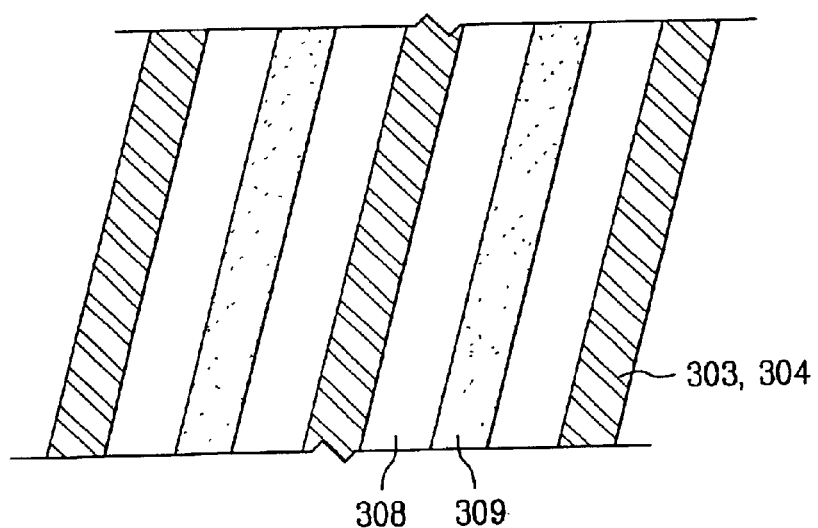
FIG. 4B illustrates a back side view of the first glass substrate 100 having the sealant, PAD connection lines, and protection film coated thereon in area shown in FIG. 4A.

FIG. 4A illustrates a sectional view of area "E" shown in FIG. 3 in accordance with a first aspect of the present invention. FIG. 4B illustrates a back side view of a substrate having PAD connection lines, and protection film coated thereon in area shown in FIG. 4A.

As described above, adhesive characteristics of the sealant 310 are greater with respect to glass substrates than to organic films. In order to enhance adhesive characteristics between the bonded substrates including an organic protection film 308, a portion of the organic protection film 108 located under where the sealant 310 is to be formed, is removed thereby allowing subsequently formed sealant 310 to directly contact the first glass substrate 300.

Referring to FIGS. 4A and 4B, the gate PAD connection lines 303 may be formed on the first substrate 300 and the data PAD connection lines 304 may be formed on a gate insulating film (not shown) also formed on the first substrate 300. The organic protection film 308, being an insulating film, may be formed over the entire surface of the substrate including the gate and data PAD connection lines 303 and 304.

In order to enhance the adhesive characteristics of the subsequently formed sealant 310, and to maintain uniformity of the cell gap, the gate insulating film (not shown) and the organic protection film 308 may be selectively removed to expose portions of the first substrate 300 between the gate and data PAD connection lines 303 and 304, thereby forming a plurality of opened areas 309. The sealant 310 may then be coated on the organic protection film 308 such that sealant 310 directly contacts the first glass substrate 300 at the opened areas 309.

According to the principles of the present invention, the organic protection film 308 may be divided into three regions, or patterning areas, in which it may be patterned. In one aspect of the present invention, a first patterning area may be arranged in a region of the substrate where no sealant 310 is to be coated (e.g. the 'A' region). In one aspect of the present invention, a second patterning area may be arranged in a region of the substrate where gate and data PAD connection lines 303 and 304, respectively, are arranged and where the sealant 310 is to be coated (e.g., the 'B' region). In one aspect of the present invention, a third patterning area may be arranged in a region of the substrate where the sealant 310 is to be coated and where the sealant contacts the substrate. Accordingly, a half-tone mask used to pattern the organic protection film 308 may be provided with first, second, and third light transmission areas each corresponding to the first, second, and third patterning areas. In one aspect of the present invention, the first light transmission area may be substantially opaque, transmitting substantially no light, the second light transmission area may be translucent, transmitting a reduced intensity of light, and the third light transmission area may be substantially transparent, transmitting a full intensity of light. The organic protection film 308 may be patterned using a photo-etching process.

Figure 1:
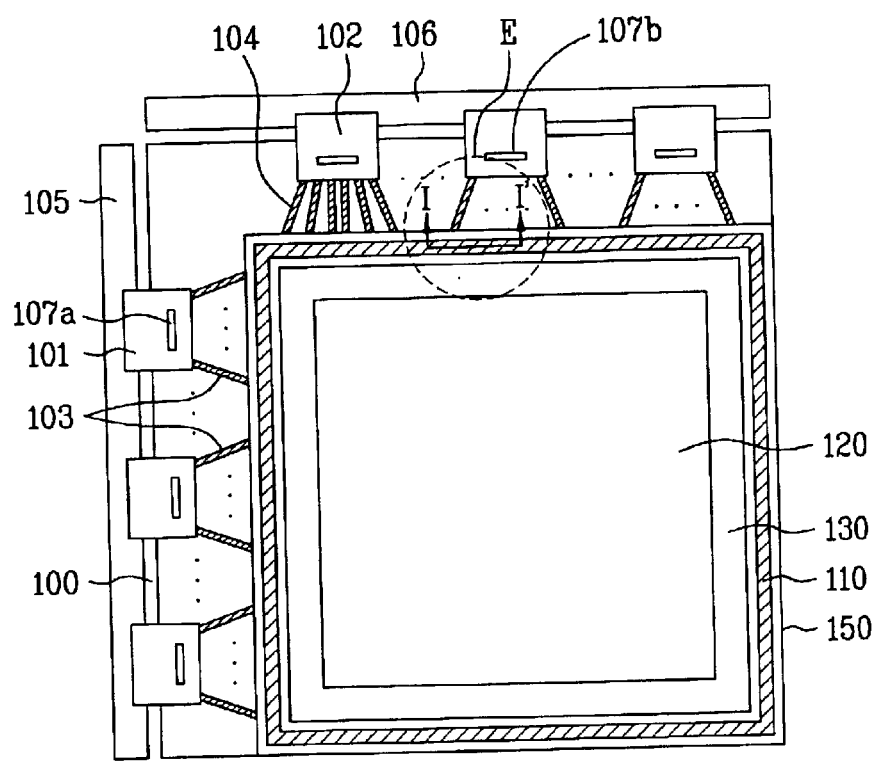
FIG. 1 illustrates a schematic view of a related art LCD device.
Figure 2A:
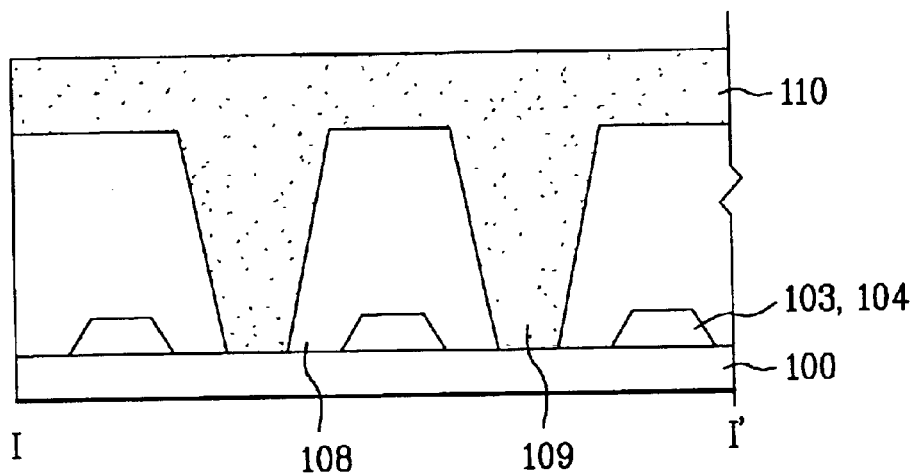
FIG. 2A illustrates a sectional view of area "E" shown in FIG. 1.
Figure 2B:
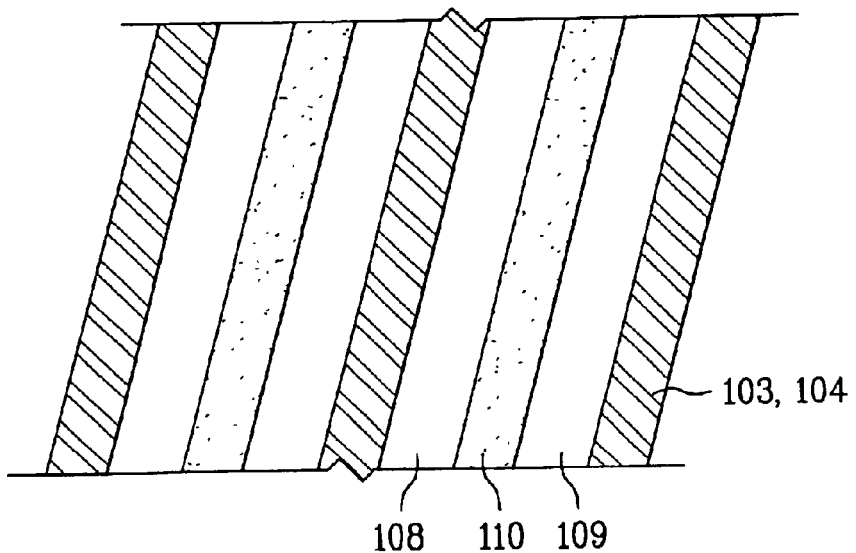
FIG. 2B illustrates a back side view of the first glass substrate 100 having the sealant, PAD connection lines, and protection film coated thereon in area shown in FIG. 2A.

Referring to FIG. 4A, portions of the organic protection film 308 that may be patterned using the half-tone mask may correspond to portions of the organic protection film 308 that underlie a subsequently formed sealant 310. For example, portions of the organic protection film 308 arranged between the PAD connection lines may be etched to form opened areas 309. The opened areas 309 between the gate PAD connection lines 303 are larger than opened areas 309 between the data PAD connection lines 304. Accordingly, the effects illustrated in FIGS. 1–2B are reduced according to the principles of the present invention because portions of the protection film located under the subsequently coated sealant is removed a predetermined amount.

A method for etching the organic protection film in accordance with a first aspect of the present invention will now be explained in greater detail.

FIGS. 5A–5D illustrate a method of removing portions of the organic protecting film in accordance with a first aspect of the present invention.

Figure 5A:
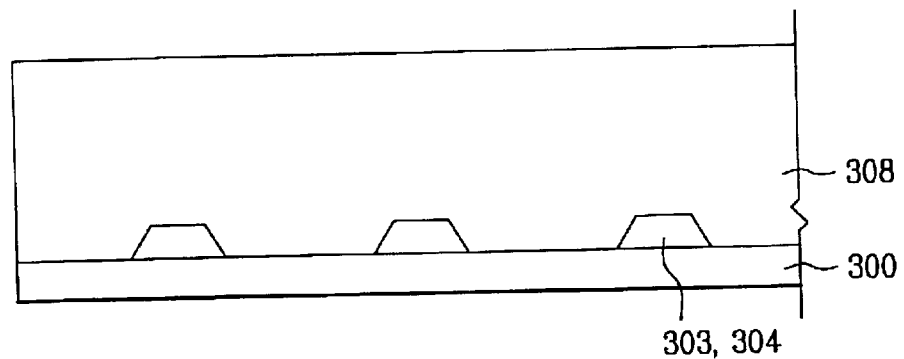
FIGS. 5A–5D illustrate a method of removing portions of the organic protecting film in accordance with the first aspect of the present invention.

Referring to FIG. 5A, the gate PAD connection lines 303 and a gate insulating film (not shown) may be formed on the first substrate 300. The data PAD connection lines 304 may be formed on the gate insulating film. The organic protection film 308 may then be formed over the gate and data PAD connection lines 303 and 304.

Figure 5B:
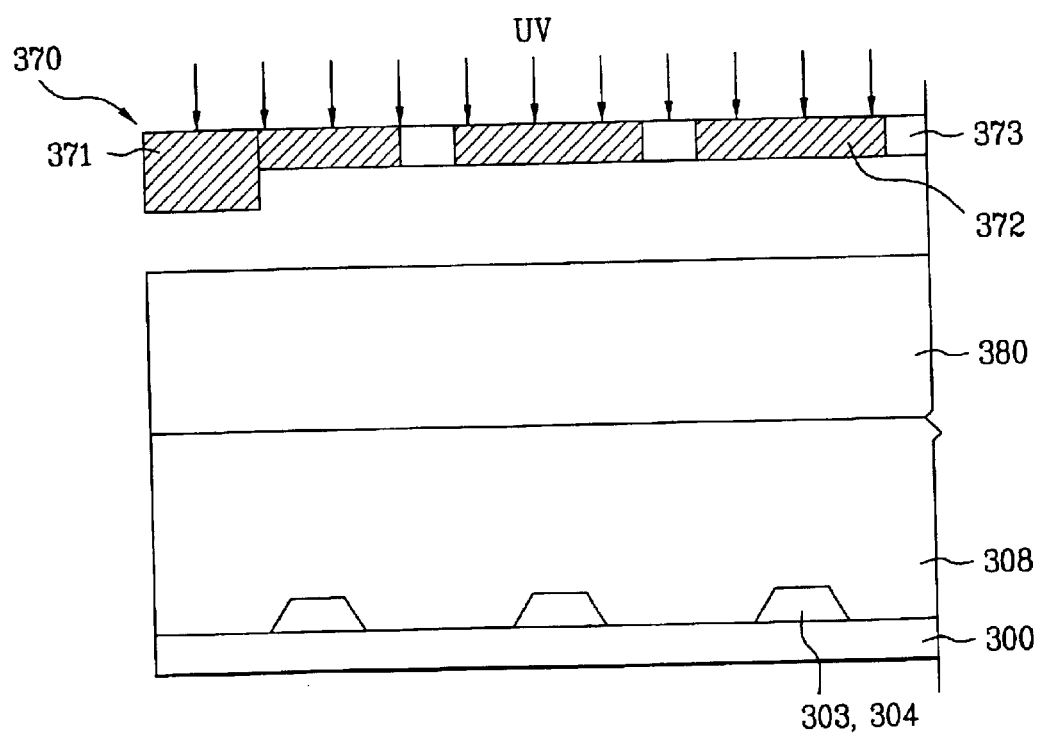
Figure 5C:
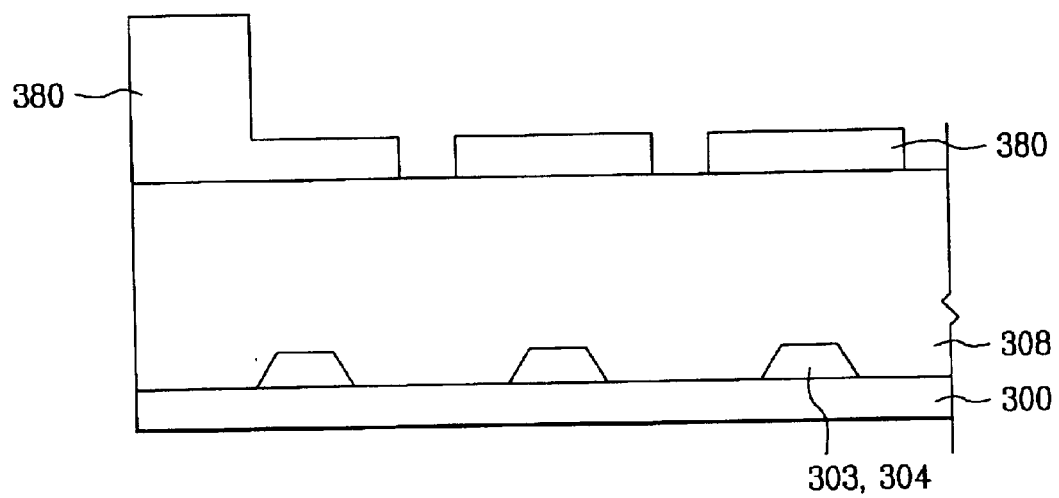

Referring to FIG. 5B, a photoresist 380 may be disposed over the organic protection film 308 and a half-tone mask 370 may be disposed over the photoresist 380. The half-tone mask 370 includes a first light transmission area 371 arranged over a region of the substrate where no sealant is to be coated. The first light transmission area 371 is substantially opaque and transmits substantially no light. The half-tone mask 370 may further include a second light transmission area 372 arranged over a region of the substrate where gate and data PAD connection lines 303 and 304 are arranged and where sealant is to be coated. The second light transmission area 372 is translucent and transmits a reduced amount of light. The half-tone mask 370 may further include a third light transmission area 373 arranged over a region of the substrate where the sealant is to be coated and where the sealant is to contact the substrate 300 between the PAD connection lines 303 and 304. The third light transmission area 373 is substantially transparent and transmits substantially all light provided to the half-tone mask 370.

The photoresist 380 may then be selectively exposed to light (e.g., UV) by the half-tone mask 370. The photoresist 380 is exposed by the light transmitted by the half-tone mask 370 and developed into the photoresist pattern shown in FIG. 5C.

Figure 5D:
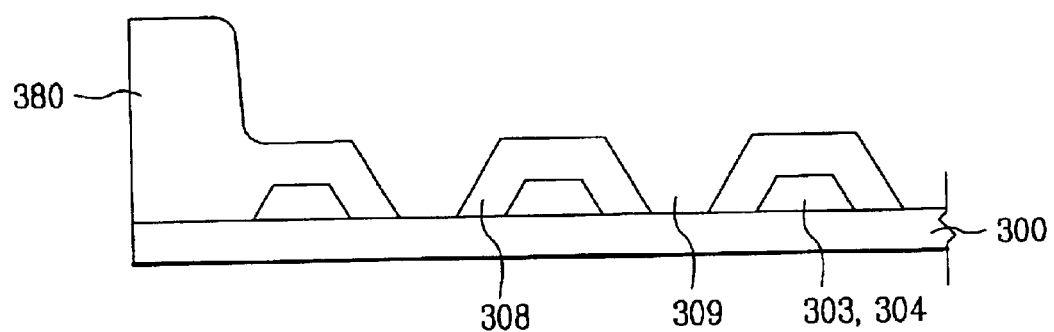

Referring now to FIG. 5D, the organic protection film 308 is etched at a fixed etch rate using the patterned photoresist 380 as an etch mask. Upon etching, portions of the organic protection film 308 arranged under the first light transmission area 371 remain substantially unetched, portions of the organic protection film 308 arranged under the second light transmission area 372 are etched an intermediate amount, and portions of the organic protection film arranged under the third patterning area 373 are etched a full maximum amount (e.g., about twice the amount as the intermediate amount) to form the opened areas 309.

Figure 6A:
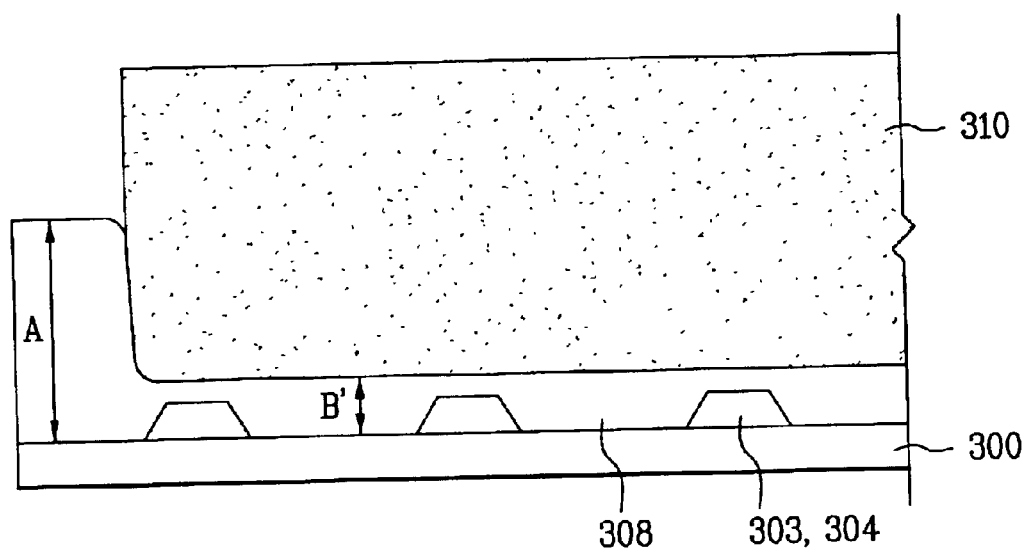
FIG. 6A illustrates a sectional area "E" shown in FIG. 3 in accordance with a second aspect of the present invention.
Figure 6B:
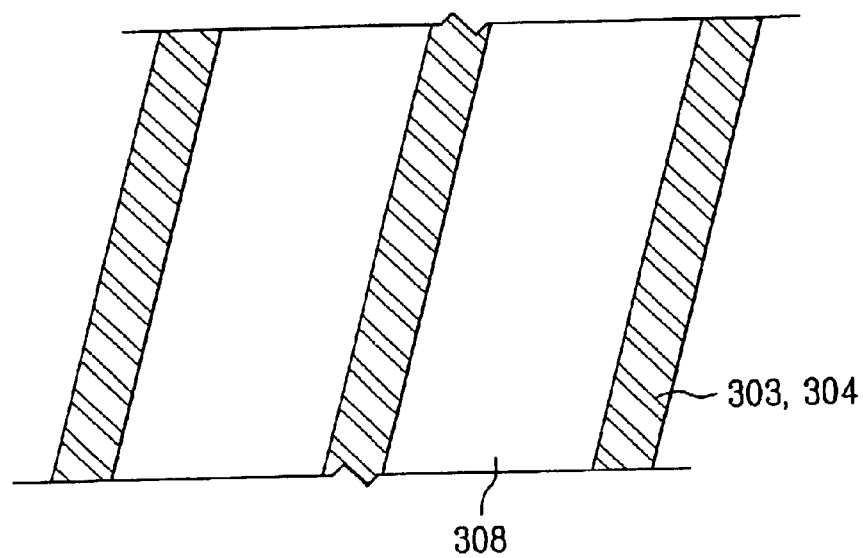
FIG. 6B illustrates a back side view of the first glass substrate 100 having the sealant, PAD connection lines, and protection film coated thereon in area shown in FIG. 6A.

FIG. 6A illustrates a sectional view of area "E'" shown in FIG. 3 in accordance with a second aspect of the present invention. FIG. 6B illustrates a back side view of a substrate having PAD connection lines, and protection film coated thereon in area shown in FIG. 6A.

In accordance with the principles of the second aspect of the present invention, the LCD may maintain the uniformity of the cell gap.

Referring to FIGS. 6A–6B, the LCD may, for example, include a plurality of gate PAD connection lines 303 and a gate insulating film (not shown) formed on a first glass substrate 300. Data PAD connection lines 304 may be formed over the gate insulating film. An organic protection film 308, being an insulating film, may be formed over an entire surface of the substrate including the gate and data PAD connection lines 303 and 304.

In order to enhance the adhesive characteristics of the subsequently formed sealant 310, and to maintain uniformity of the cell gap, portions of the organic protection film 308 that will underlie a subsequently formed sealant may be selectively removed. For example, portions of the organic protection film 308 that will underlie the subsequently formed sealant may be selectively removed such that the organic protection film 308 has a thickness in a range of about 2000 Å–5000 Å. It should be noted, however, opened areas are not formed as they were in with respect to the first aspect of the present invention.

According to the principles of the present invention, the organic protection film 308 may divided into two regions, or patterning areas, in which it may be patterned using either a half-tone mask or a general mask. In one aspect of the present invention, a first patterning area may be arranged in a region of the substrate where substantially no organic protection film is to be removed (e.g., the 'A' region) and a second patterning area where a portion of the organic protection film is to be removed (e.g., the 'B' region). In one aspect of the present invention, the portion of the organic protection film removed in the 'B' region results in the organic protection film 308 having a predetermined thickness.

In one aspect of the present invention, a half-tone mask, may for example, be provided with first and second light transmission areas each corresponding the first and second patterning areas. In one aspect of the present invention, the first light transmission area may be substantially opaque, transmitting substantially no light and the second light transmission area may be translucent, transmitting a reduced amount of light. In one aspect of the present invention, the second transmission area may transmit a predetermined amount of light such that a portion of the organic protection film 308 in the 'B' region is partially removed by etching. In another aspect of the present invention, a general mask may, for example, be provided in the such that a portion of the organic protection film 308 in the 'B' region may be at least partially removed by etching.

Sealant 310 may be disposed over the portions of the organic protection film that are etched. According to the principles of the present invention, adhesive characteristics of the sealant 310 may be maintained even when it is formed on the organic protection film 308 because the etched organic protection film 308 is thin. In one aspect of the present invention, no opened areas are formed within the organic protection film. Accordingly, the uniformity of the cell gap may be maintained and the distance between the PAD connection lines 303 and 304 may be decreased, thereby increasing the resolution of the LCD.

A method for etching the organic protection film in accordance with a second aspect of the present invention will now be explained in greater detail.

FIGS. 7A–7D illustrate a method of removing portions of the organic protecting film in accordance with a second aspect of the present invention.

Figure 7A:
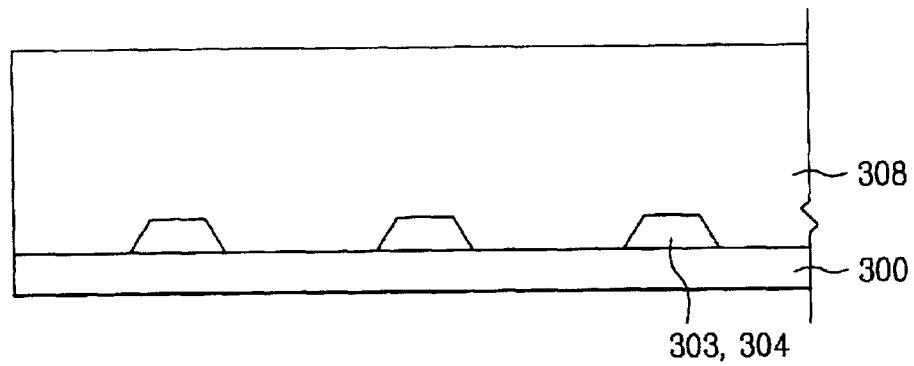
FIGS. 7A–7D illustrate sectional views in accordance with the second aspect of the present invention.

Referring to FIG. 7A, the gate PAD connection lines 303 are and gate insulating film (not shown) may be formed on a first substrate 300. Data PAD connection lines 304 may be formed on the gate insulating film. The organic protection film 308 may then be formed over the gate and data PAD connection lines 303 and 304.

Figure 7B:
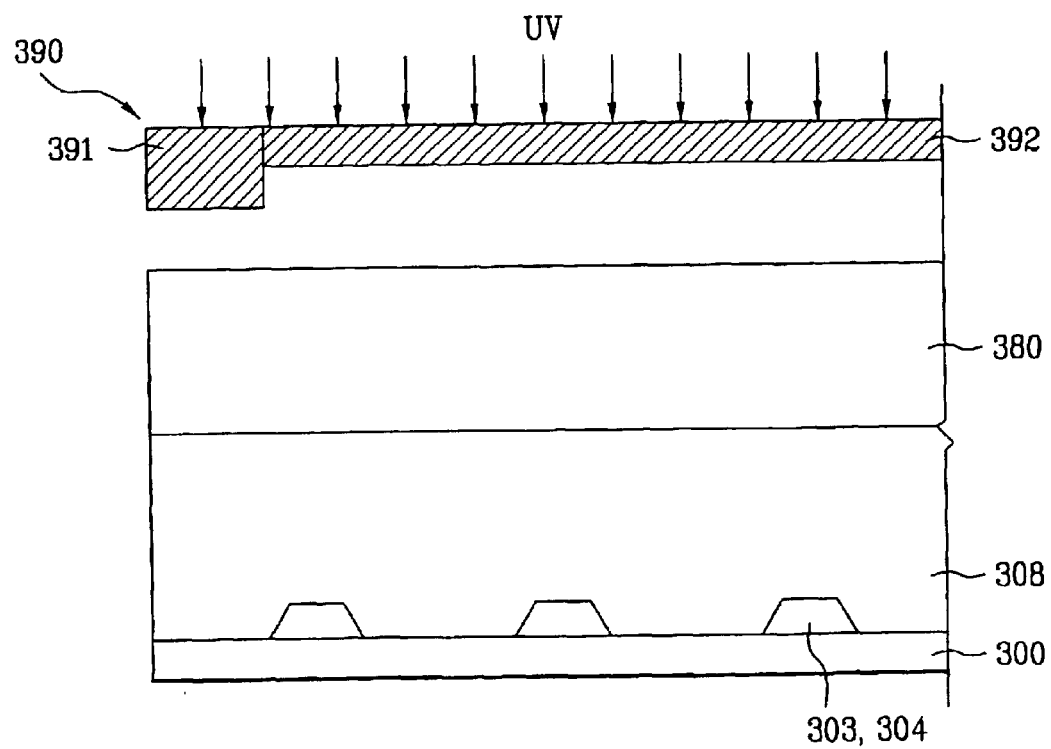
Figure 7C:
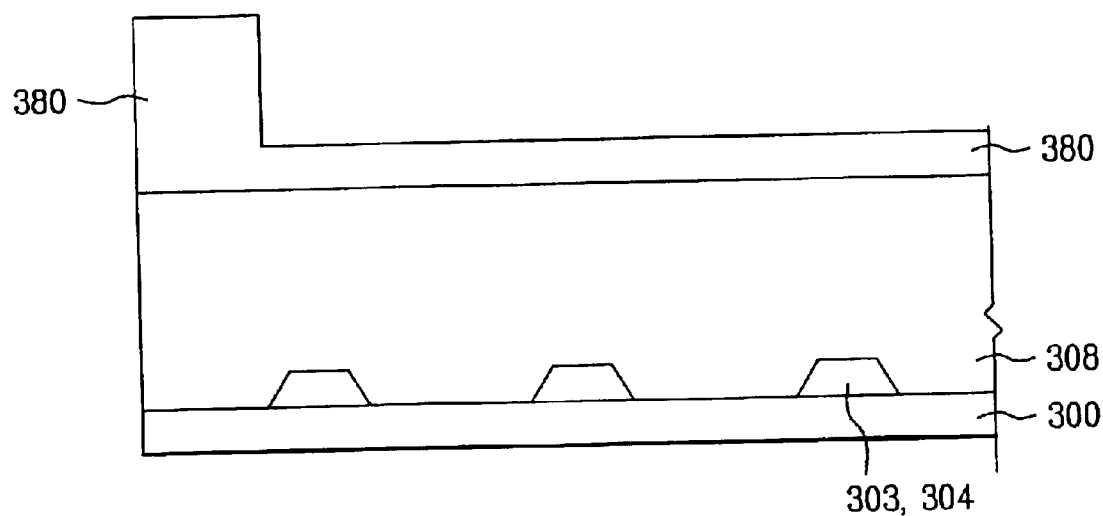

Referring to FIG. 7B, a photoresist 380 may be disposed over the organic protection film 308 and a half-tone mask 390 may be disposed over the photoresist 380. The half-tone mask 390 includes a first light transmission area 391 arranged over a region of the substrate where no sealant is to be coated. The first light transmission area 391 is substantially opaque and transmits substantially no light. The half-tone mask 390 may further include and a second light transmission area 392 arranged over a region of the substrate where sealant is to be coated. The second light transmission area 392 is translucent and transmits a reduced amount of light.

The photoresist 380 may then be selectively exposed to light (e.g., UV) by the half-tone mask 390. The photoresist 380 is exposed by the light transmitted by the half-tone mask 390 and developed into the photoresist pattern shown in FIG. 7C.

Figure 7D:
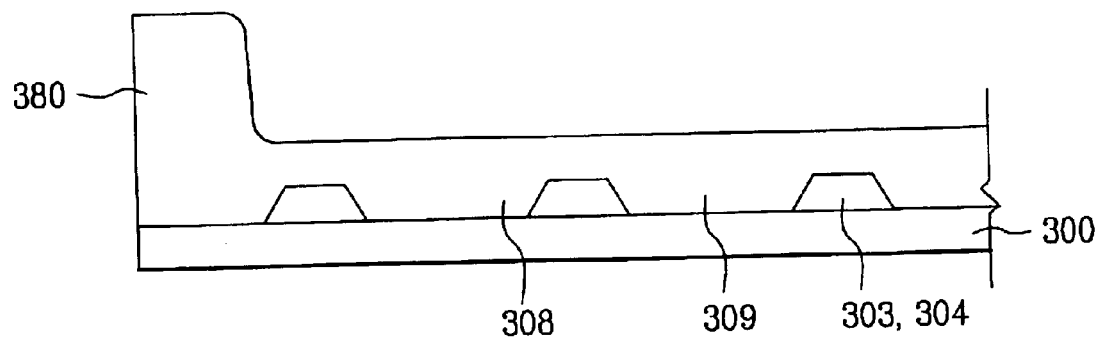

Referring now to FIG. 7D, the organic protection film 308 is etched at a fixed etch rate using the patterned photoresist 380 as an etch mask. Upon etching, portions of the organic protection film 308 arranged under the first light transmission area 391 remain substantially unetched and portions of the organic protection film 308 arranged under the second light transmission area 392 are etched an intermediate amount such that about half of the organic protection film 308 is removed. According to the principles of the present invention, etching of the organic protection film 308 is regulated (e.g., by timing the etch) such that the portions of the organic protection film 308 within the 'B' region are etched more than those portions of the organic protection film 308 within the 'B' region of the first aspect of the present invention.

Though not shown in the Figures, by regulating the time during which the organic protection film 308 is etched, a general mask may be used to selectively etch any portion of the organic protection film 308 to within a predetermined thickness.

Though a method for etching a protection film by using photoresist is taken as an example in the first or second embodiment, formation of a protection film with different thickness is possible by exposing the protection film directly without using the photoresist if the protection film is formed of a photosensitive organic insulating film.

Use of the aforementioned LCD and method for fabricating the same is advantageous for the following reasons.

First, according to the first aspect of the present invention, opened areas may be formed between the gate and data PAD connection lines after a portion of the protection film, over which sealant is to be subsequently formed, is removed to a predetermined thickness. Accordingly, uniformity of the cell gap between the two substrates may be maintained while an adhesive force between the two substrates is maximized because a depth of the opened area is smaller than the depth of opened areas illustrated in FIG. 2A even when distances between PAD connection lines are small and when different materials are formed under organic protection film.

Second, according to the second aspect of the present invention, a portion over which sealant to be subsequently formed may be removed such that no opened area is formed. Accordingly, uniformity of the cell gap may be maintained while an adhesive force between the two substrates is maximized. Further, distances between PAD connection lines may be reduced to increase a resolution of the LCD.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A liquid crystal display, comprising:
   a substrate;
   a plurality of PAD connection lines arranged on the substrate;
   a protection film arranged over the surface of the substrate and the plurality of PAD connection lines, wherein the protection film includes first and second flat portions, each with a different thickness; and
   a sealant arranged over the first flat portion of the protection film, wherein a top surface of the first flat portion is closer to the substrate than the second flat portion of the protection film.

2. The liquid crystal display as claimed in claim 1, further comprising a plurality of opened areas within the protection film formed between the PAD connection lines.

3. The liquid crystal display as claimed in claim 1, wherein a thickness of the first flat portion of protection film is approximately 2000 Å–5000 Å.

4. The liquid crystal display as claimed in claim 1, wherein the plurality of PAD connection lines include a plurality of gate PAD connection lines and a plurality of data PAD connection lines.

5. The liquid crystal display as claimed in claim 4, further comprising an insulating film arranged over the plurality of gate PAD connection lines.

6. The liquid crystal display as claimed in claim 1, wherein the protection film is formed from an organic insulating film.

7. A method for fabricating a liquid crystal display, comprising:
   providing a substrate;
   forming a plurality of PAD connection lines on the substrate;
   forming a protection film over an entire surface of the substrate including the plurality of PAD connection lines;
   patterning the protection film such that the protection film has first and second flat portions, the first flat portion having a predetermined thickness over the plurality of PAD connection lines and such that portions of the substrate between the PAD connection lines are exposed; and
   coating a sealant on the first portion of the protection film.

8. A method for fabricating a liquid crystal display, comprising:
   providing a substrate;
   forming a plurality of PAD connection lines on the substrate;
   forming a protection film over an entire surface of the substrate including the plurality of PAD connection lines;
   patterning a first portion of the protection film using a half-tone mask such that the first portion of the protection film has a predetermined thickness over the plurality of PAD connection lines and such that portions of the substrate between the PAD connection lines are exposed; and
   coating a sealant on the first portion of the protection film.

9. The method as claimed in claim 8, wherein the half-tone mask includes a first light transmission area, a second light transmission area, and a third light transmission area.

10. The method as claimed in claim 9, wherein the second light transmission area is capable of transmitting more light than the first light transmission area.

11. The method as claimed in claim 9, wherein the third light transmission area is capable of transmitting more light than the second light transmission area.

12. The method as claimed in claim 9, wherein the first light transmission area is arranged over a second portion of the protection film, not included within the first portion of the protection film.

13. The method as claimed in claim 9, wherein the second light transmission area is arranged over the plurality of PAD connection lines.

14. The method as claimed in claim 9, wherein the third light transmission area is arranged over the substrate between the plurality of PAD connection lines.

15. The method as claimed in claim 7, wherein the plurality of PAD connection lines further comprise a plurality of gate PAD connection lines and a plurality of data PAD connection lines.

16. The method as claimed in claim 15, further including forming a gate insulating film on the plurality of gate PAD connection lines.

17. The method as claimed in claim 16, further comprising removing portions of the gate insulating film between the plurality of PAD connection lines.

18. The method as claimed in claim 7, wherein the protection film comprises an organic insulating film.

19. A method for fabricating a liquid crystal display, comprising:

providing a substrate;

forming a plurality of PAD connection lines on the substrate;

forming a protection film over an entire surface of the substrate including the plurality of PAD connection lines;

patterning the protection film such that the protection film has first and second flat portions, wherein a top surface of the first flat portion of the protection film is closer to the substrate than the second flat portion of the protection film; and coating a sealant on the patterned first flat portion of the protection film.

20. The method as claimed in claim 19, wherein the patterned first flat portion of the protection film has a thickness of about 2000 Å–5000 Å.

21. The method as claimed in claim 19, further comprising patterning the first flat portion of the protection film by timing the patterning.

22. The method as claimed in claim 8, wherein the plurality of PAD connection lines further comprise a plurality of gate PAD connection lines and a plurality of data PAD connection lines.

23. The method as claimed in claim 8, wherein the protection film comprises an organic insulating film.

* * * * *